(12) United States Patent
Henry et al.

(10) Patent No.: US 8,663,817 B2
(45) Date of Patent: Mar. 4, 2014

(54) ALUMINUM ALLOY STRIPS FOR BRAZED HEAT EXCHANGER TUBES

(75) Inventors: Sylvain Henry, Saint Jean de Moirans (FR); Elodie Perrin, Voiron (FR)

(73) Assignee: Constellium France, Paris (FR)

( * ) Notice: Subject to any disclaimer, the term of this patent is extended or adjusted under 35 U.S.C. 154(b) by 451 days.

(21) Appl. No.: 12/994,965

(22) PCT Filed: May 28, 2009

(86) PCT No.: PCT/FR2009/000619
§ 371 (c)(1),
(2), (4) Date: Nov. 29, 2010

(87) PCT Pub. No.: WO2009/156607
PCT Pub. Date: Dec. 30, 2009

(65) Prior Publication Data
US 2011/0100615 A1 May 5, 2011

(30) Foreign Application Priority Data
Jun. 2, 2008 (FR) ..................................... 08 03018

(51) Int. Cl.
B32B 15/04 (2006.01)
B32B 15/18 (2006.01)
B32B 15/20 (2006.01)
F28F 1/00 (2006.01)
F28F 21/08 (2006.01)

(52) U.S. Cl.
USPC ........... 428/654; 428/34.1; 428/576; 165/177

(58) Field of Classification Search
USPC .................. 428/576, 654, 650, 34.1
See application file for complete search history.

(56) References Cited

U.S. PATENT DOCUMENTS

| 4,196,262 | A | 4/1980 | Anthony et al. |
| 5,744,255 | A | 4/1998 | Doko et al. |
| 6,387,540 | B1 | 5/2002 | Yoshidomi et al. |
| 6,451,453 | B1 | 9/2002 | Kneza et al. |
| 2002/0050346 | A1 | 5/2002 | Colin et al. |
| 2006/0102328 | A1 | 5/2006 | Toyama et al. |
| 2006/0219393 | A1 | 10/2006 | Igami |
| 2007/0031695 | A1 | 2/2007 | Henry et al. |

FOREIGN PATENT DOCUMENTS

| EP | 0637481 | 2/1995 |
| EP | 1413427 | 4/2004 |
| JP | 11315337 | 11/1999 |

(Continued)

OTHER PUBLICATIONS

Machine Translation, Tanaka, et al., JP 2004-217982, Aug. 2004.*

(Continued)

*Primary Examiner* — Michael La Villa
(74) *Attorney, Agent, or Firm* — Ladas & Parry, LLP

(57) ABSTRACT

A brazing sheet made up of a core sheet made of aluminum alloy covered on at least one side with a layer of cladding forming a sacrificial anode. The layer of cladding is formed of an aluminum alloy of chemical composition, in % by weight: Si: >2.0-7.0; Fe<0.5; Cu<1.0; Mn: 1.0-2.0; Mg<0.5; Zn: 1.0-3.0; Cr<0.25; Ni<1.5; Ti<0.25; Co<1.5; V, In, Sn, Zr, Sc<0.25 each; other elements <0.05 each and 0.15 in total. A heat exchanger tube may be produced by folding and brazing from the brazing sheet, where the layer of cladding forms a sacrificial anode constituting the lining of the tube or "inner-liner."

27 Claims, 2 Drawing Sheets

(56) References Cited

FOREIGN PATENT DOCUMENTS

| | | |
|---|---|---|
| JP | 2004217982 | 8/2004 |
| JP | 2004217983 | 8/2004 |
| JP | 2007127306 | 5/2007 |

OTHER PUBLICATIONS

Matweb 3000 Data Sheet, "Overview of materials for 3000 Series Aluminum Alloy," downloaded from www.matweb.com on Feb. 24, 2013, 3 pages.*

Matweb 4000 Data Sheet, "Overview of materials for 4000 Series Aluminum Alloy," downloaded from www.matweb.com on Feb. 24, 2013, 3 pages.*

Matweb 3000 Data Sheet, "Overview of materials for 3000 Series Aluminum Alloy," (no date), downloaded from www.matweb.com on Feb. 24, 2013, 3 pages.*

Matweb 4000 Data Sheet, "Overview of materials for 4000 Series Aluminum Alloy," (no date), downloaded from www.matweb.com on Feb. 24, 2013, 3 pages.*

\* cited by examiner

ALUMINUM ALLOY STRIPS FOR BRAZED HEAT EXCHANGER TUBES

FIELD OF THE INVENTION

The invention relates to the field of bands or strips made of aluminum alloy designed for the manufacture of heat exchangers, in particular those used for cooling engines, heating or air-conditioning of cab interiors, or for any other heat exchange function, in motor vehicles.

These latter, in particular those used for the tubes of engine cooling radiators or heating radiators, are generally clad on the outside with a brazing alloy and on the inside with an alloy designed to protect against corrosion and erosion by the cooling liquid.

The invention more particularly relates to these covered strips, which are part of what are called brazing sheets, used for the tubes of heat exchangers, in contact with the coolant.

BACKGROUND OF RELATED ART

Aluminum alloys are now mainly used in the manufacture of heat exchangers for cars because of their low density, which provides a saving in weight, in particular when compared to copper alloys, while providing good thermal conductivity, being easy to use and having good resistance to corrosion.

All aluminum alloys discussed in this application are designated, unless otherwise stated, according to the designations defined by the ANSI H35.1/H35.1(M)-2006 standard, Revision of H35.1H35.1(M)-2004, *American National Standard Alloy and Temper Designation System for Aluminum*, published by The Aluminum Association, Inc.

Exchangers comprise tubes for the circulation of the internal heating or cooling fluid and fins to increase heat transfer between the internal fluid and the external fluid, and they are manufactured either by mechanical assembly, or by brazing.

In the more frequent case of assembly by brazing, the core sheet constituting the tube, generally made of aluminum alloy of the AA3xxx series, is clad on the outside, in contact with the fins, with a so-called brazing alloy, generally of the AA4xxx series. This configuration is illustrated in FIG. 1, diagram 1*a*, the core sheet having the reference mark 2 and the brazing alloy reference mark 1.

The latter melts at a temperature lower than the melting point of the core and, by applying a thermal brazing cycle, is able to create a connection between the two materials to be brazed: the fins and the outside of the tube.

The core sheet may also be clad on the inside by a layer of protection 3 against corrosion and erosion by the coolant or heat transfer fluid. This configuration is illustrated in FIG. 1, diagram 1*b*.

This latter layer, generally also in the form of co-rolled sheet, is known in the profession as the "inner-liner"; it is generally made of an alloy of the AA7xxx series.

The internal cladding alloy most frequently used to date is of type AA7072.

Because of its relatively large zinc content, on average 1.05% by weight expressed as a percentage, its corrosion potential is lower than that of the core, typically made of alloy of the Al—Mn—Cu type, which enables it to perform its role of sacrificial anode.

As examples of Al—Mn—Cu core alloys, mention may be made of alloys 3916 and 3915 described respectively in patent EP 1075935 and request EP 1413427 by the applicant; their compositions are given below as percentages by weight, not counting impurities limited to 0.05% each and 0.15% in total

|  | Si | Fe | Cu | Mn | Mg | Zn | Ti |
|---|---|---|---|---|---|---|---|
| 3916 | 0.15-0.30 | <0.25 | 0.5-1.0 | 1.0-1.4 | <0.01 | <0.2 | <0.1 |
| 3915 | 0.15-0.30 | <0.25 | 0.5-1.0 | 1.0-1.4 | 0.10-0.35 | <0.2 | <0.1 |

However, because of its solidus temperature, of the same order as that of core alloys in regularly use, i.e. approximately 640° C., alloy AA7072 does not take part in brazing.

In addition, for reasons of heat exchange efficiency, tubes with a so-called B section, as shown in FIG. 2 are replacing simple welded rolled tubes more and more.

They are obtained by folding, in particular from a brazing strip or plate such as previously defined, i.e. with a brazing cladding on their outside, and a sacrificial cladding on the inside.

However, brazing of this type of tube is difficult, particularly at the level of the outside of foot 6 as shown inside the circle of FIG. 2. seen from the left.

Obtaining a correct brazing joint 5 in this zone requires a significant amount of brazing alloy 4 from cladding 1 to be contributed, while the available external volume of said brazing alloy is limited and located only at the level of the center of the foot as illustrated in FIG. 2 viewed from the left, in the center of the circle, and in diagrams 1*a* and 1*b*.

One of the known solutions to this problem involves increasing the thickness of external cladding 1 to give a greater addition of metal in zone 6.

It should be pointed out that, typically, in the case of a roll-welded tube which is not subject to this problem, external cladding corresponds to 10% of the total thickness of the brazing sheet as against 10% for the internal cladding, for a total thickness generally ranging between 200 and 300 μm.

In the case of a folded and brazed tube with a B section, in order to increase the thickness of the external cladding 1 of brazing alloy, it is necessary either to increase the total thickness of the brazing sheet by preserving the above-mentioned percentages, or to increase the percentage of external cladding with a constant thickness of brazing sheet.

These two solutions are clearly not satisfactory.

The first goes completely against the general trend in the automobile field, and more particularly in that of heat exchangers, which involves reducing the thickness of components as much as possible.

The second involves reducing the thickness of the core which is precisely what mainly provides the mechanical resistance and the corrosion resistance of the material.

Another known solution involves using a brazing alloy of type AA4045 or AA4343 for the internal cladding or "inner-liner". But such an alternative inevitably results in an unacceptable drop in the corrosion resistance, in particular as measured by the test referred to as "OY" of experts in the field and described below.

Lastly, requests JP2005037062 by Toyo Radiator, JP2004217982 and JP2004217983 by Sumitomo Light Metal describe alternative solutions primarily consisting in folds of brazing sheet in the central zone of the foot so as to bring the two parts of the external cladding into contact and thereby guarantee brazing.

Such solutions, just as the first one described, have in particular the disadvantage of inducing a surplus of material used and an increase in overall spatial requirements for a constant internal fluid circulation section.

THE PROBLEM

The invention aims at solving these brazing difficulties without an excess of material used or excess size or weight while providing internal corrosion resistance at least equivalent to that obtained in the case of a brazing sheet of prior art whose internal layer consists of an alloy of the AA7xxx series.

SUBJECT OF THE INVENTION

The subject of the invention is a brazing sheet made up of a core sheet made of aluminum alloy clad on at least one side with a layer of cladding forming a sacrificial anode, characterized in that said layer of cladding consists of an aluminum alloy of chemical composition, expressed as percentages by weight:

Si: >2.0-7.0 Fe<0.5 Cu<1.0 Mn: 1.0-2.0 Mg<0.5 Zn: 1.0-3.0 Cr<0.25 Ni<1.5 Ti<0.25 Co<1.5 V, In, Sn, Zr, Sc<0.25 each, other elements <0.05 each and 0.15 in total.

According to an advantageous embodiment, the core sheet is made of aluminum alloy of the AA3xxx series and preferably made of alloy 3915 or 3916.

In the same way, the brazing sheet is generally clad on the outside, opposite the layer of cladding forming the sacrificial anode, with a layer of aluminum brazing alloy of the AA4xxx series.

According to a preferred embodiment, the various layers, of cladding, brazing and core sheet, are assembled by co-rolling.

Finally another subject of the invention is a heat exchanger tube produced by folding and brazing from a brazing sheet as described above, whose layer of cladding forming a sacrificial anode constitutes the lining of the tube or "inner-liner".

Figure 1:
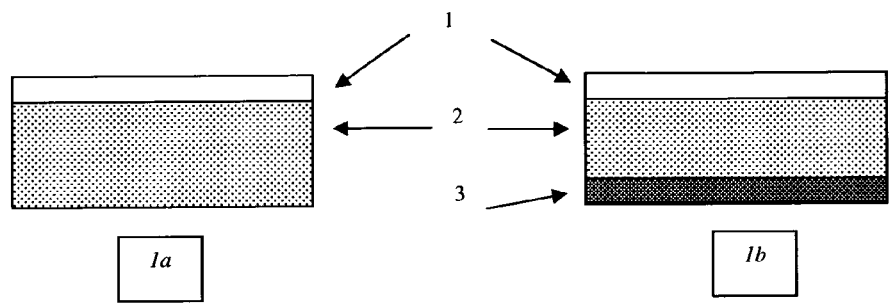
FIG. 1 represents, according to diagram 1a, a brazing sheet with two layers, the core sheet having reference mark 2 and the brazing alloy (which may also be the layer of cladding according to the invention), reference mark 1, and according to diagram 1b, a brazing sheet with three layers, the core sheet having reference mark 2, the brazing alloy reference mark 1 and the layer of cladding forming the sacrificial anode, reference mark 3.
Figure 2:
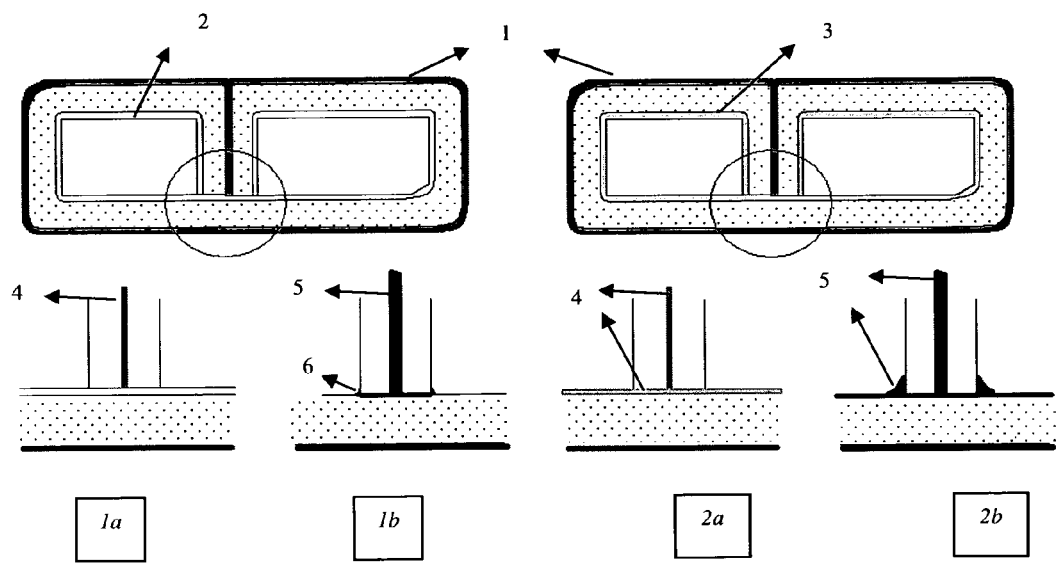
FIG. 2 shows schematically.

On the left a B-tube obtained by folding a brazing sheet made up of a core sheet clad on an outside face with a brazing alloy 1 and on the inside with a cladding alloy 2 having the single role of protecting the core against corrosion, but not playing any part in brazing.

Diagram 1a represents an enlarging of the central zone of the foot surrounded with brazing alloy at 4, before the brazing operation.

Diagram 1b represents the same zone after brazing, with at 5 and in thick black, the brazing joint, and at 6 the zone presenting difficulties of brazing.

On the right, the same diagrammatic view of the B-tube, but according to the invention, the inner face being clad with a layer of cladding alloy 3 protecting the core against corrosion through the effect of the sacrificial anode but playing a part in brazing.

In diagram 2a, before brazing, the brazing alloy of the external cladding appears as previously at 4, and the internal cladding is also shown; and in diagram 2b, after brazing, the brazing joint 5 which also covers the zone that was previously difficult to braze.

Figure 3:
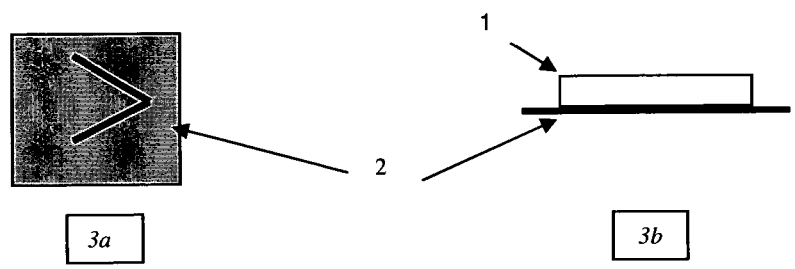

FIG. 3 illustrates the so-called "V" test used to evaluate aptitude for brazing, with at 3a a top view and at 3b a side view.

Plate 2 is made of the material to be tested. The "V" 1 consists of a bare strip of alloy of the AA3xxx type, for example AA3003.

Figure 4:
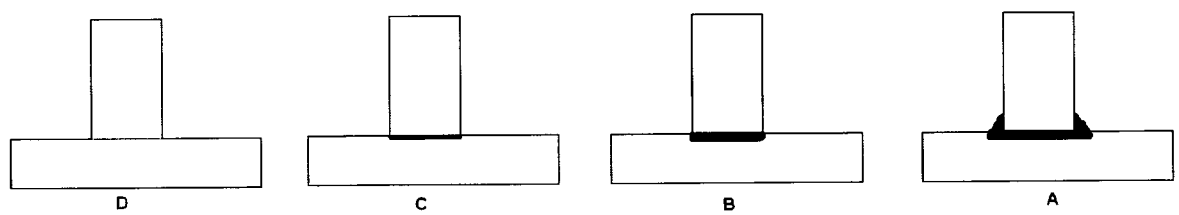

FIG. 4 shows schematically the means of classification from A to D of the quality of the brazing joints produced during the V test, after cuts perpendicular to the leg planes of the "V" and to the plane of the plate, followed by metallographic observation.

DESCRIPTION OF THE INVENTION

The invention involves the use, for the layer of cladding forming the sacrificial anode of a brazing sheet, of an alloy whose composition is optimized in order to attain:

corrosion behavior performances, in particular evaluated by the "OY" test known to experts in the field and described in the chapter "Examples", at least identical to those of the same sheet using for this layer an alloy of type AA7072 a melting point of said layer that allows easy brazing.

More specifically, the family in question is characterized by the following chemical composition, expressed as percentages by weight:

Si: >2.0-7.0 Fe<0.5 Cu<1.0 Mn: 1.0-2.0 Mg<0.5 Zn: 1.0-3.0 Cr<0.25 Ni<1.5 Ti<0.25 Co<1.5 V, In, Sn, Zr, Sc<0.25 each, other elements <0.05 each and 0.15 in total.

The concentration ranges imposed on the components of each alloy are explained by the following reasons:

Si is the major element impacting the aptitude for brazing. Its content must be strictly higher than 2% because up to this value, the aptitude for brazing is not satisfactory; in contrast, above 7%, protection against corrosion through the effect of the sacrificial anode is no longer sufficient. Preferably, its content ranges between 3 and 5% and even more preferably between 3 and 4%.

Fe is generally an impurity for aluminum; phases with iron are favored sites at which corrosion pits may start. Because of this, the Fe content must be lower than 0.5% and preferably lower than 0.3%.

Cu has a favorable effect on mechanical resistance but it also increases the corrosion potential, thereby reducing the effect of the sacrificial anode. Its non-homogeneous distribution within the alloy may also increase the risks of galvanic corrosion. Because of this, the Cu content must be limited to 1% and preferably to 0.8%. In certain cases, it may even be desirable to limit the copper content to that of an impurity, i.e. 0.05%, in order to avoid phenomena of dissolution then re-precipitation of copper on the surface.

Mn is a hardening element; it has a positive effect on resistance after brazing by hardening in a solid solution and in the form of fine precipitates. Below 1%, hardening is insufficient. On the other hand, above 2%, it gives rise to the formation of coarse inter-metallic phases that are highly unfavorable to alloy flowability.

Mg has a positive impact on mechanical resistance, but it is detrimental to brazability, insofar as it migrates on the surface of the cladding and, especially in the case of brazing of the Nocolok® type, it forms an oxide coating which has an unfavorable impact on the brazing properties. For this reason, Mg content must be limited to 0.5% and better still, in the case of brazing with flux, to 0.3%. For certain difficult applications, it may be necessary to reduce the Mg content to that of an impurity, i.e. 0.05%, and even, in accordance with patent EP 1075935 B1 by the applicant, to 0.01%

Zn contributes significantly to the sacrificial effect of the layer of cladding. Below 1%, this effect is insufficient, and above 3%, the effect is too marked to ensure a sufficiently durable protection. The preferred range is from 1.5 to 2.5%.

Ni and Co may be added up to a content of 1.5% to improve the mechanical characteristics of the alloy as well as its corrosion resistance, in particular in a base medium (pH higher than 9).

Ti may be added up to a content of 0.25% to improve the corrosion behavior of the alloy. Titanium concentrates on layers parallel to the direction of rolling, which is favorable to lateral corrosion rather than penetrating pitting.

Cr, V, Zr and Sc are anti-recrystallizing elements which improve in particular mechanical resistance after brazing, but also act favorably on corrosion resistance. They can be added up to a content of 0.25% each.

Finally In and Sn have a sacrificial effect similar to that of Zn and may be added up to a content of 0.25% each.

The details of the invention will be understood better with the help of the examples below, which are not however restrictive in their scope.

EXAMPLES

Several plates of 3916 core alloy (according to the above-mentioned patent EP 1075935) and brazing alloy AA4045, together with seven plates of cladding alloy for sacrificial anodes and a plate of alloy AA7072 used as a reference were cast.

The composition of the six cladding alloys 1 to 6 according to the invention together with an alloy 7, with an Si content of 2.0%, outside the scope of the invention, is indicated in table 1 below.

TABLE 1

| | Alloy | | | | |
|---|---|---|---|---|---|
| | Si | Fe | Cu | Mn | Zn |
| 1 | 2.5 | 0.15 | — | 1.15 | 1.4 |
| 2 | 3 | 0.15 | — | 1.15 | 1.4 |
| 3 | 3.5 | 0.15 | — | 1.15 | 1.4 |
| 4 | 2.5 | 0.15 | 0.4 | 1.15 | 1.6 |
| 5 | 3.5 | 0.15 | 0.4 | 1.15 | 1.6 |
| 6 | 2.5 | 0.15 | 0.65 | 1.35 | 1.8 |
| 7 | 2.0 | 0.15 | — | 1.15 | 1.4 |

Assemblies were made from these plates so that each thickness of brazing alloy on one side and cladding alloy on the other side of the core plate made of alloy 3916 accounted for 10% of the total thickness.

Assemblies were also made in the same way with the brazing alloy AA4045 on each side.

These assemblies were hot rolled, then cold rolled in order to produce cladded strips of thickness 0.25 mm. These strips were then subjected to a restoration treatment of 2 hours at 280° C. following a temperature rise at a speed of 45° C./min.

The test piece described in FIG. 3 was used to evaluate the aptitude for brazing of these materials.

The "V" consists of a bare alloy 3003 strip, in H24 state, and thickness 0.3 mm. A degreasing treatment of 15 min at 250° C. was applied to the metal to be brazed. A Nocolok® flux was then deposited on sheet 2 of the metal to be brazed. Brazing was performed in a furnace made of glass with a double wall allowing the movements of liquid braze and the formation of the joints during the treatment to be observed. The thermal cycle was made up of a temperature rise up to 600° C. at a speed of approximately 20° C./min, holding for 2 minutes at 600° C., and falling at approximately 30° C./min. The whole operation was performed under continuous nitrogen sweeping, at a flow rate of 8 l/min.

The results are first of all qualified by a mark from A to E allotted according to an examination by visual inspection according to the following scale:

| | Note allotted | | | | |
|---|---|---|---|---|---|
| | A | B | C | D | E |
| Length of joint formed compared to the overall length of the V | 100% | 90% | 75% | 50% | 0% |

The results obtained are indicated in table 2, the tests having been repeated four times for each cladding alloy.

TABLE 2

| Alloy | 4045 | 7072 | 1 | 2 | 3 | 4 | 5 | 6 | 7 |
|---|---|---|---|---|---|---|---|---|---|
| Joint rating | A | E | A | A | A | A | A | A | D |

Metallographic tests of the brazing joints produced during the V test were also carried out after cuts perpendicular to the leg planes of the "V" and to the plane of the plate, and the quality of the joints was rated according to the scale as illustrated in FIG. 4.

The results obtained are indicated in table 3 below:

TABLE 3

| Alloy | 4045 | 7072 | 1 | 2 | 3 | 4 | 5 | 6 | 7 |
|---|---|---|---|---|---|---|---|---|---|
| Joint rating | A | D | C | B | A | B | A | C | D |

It appears from these tests that alloys 3 and 5, with an Si content of 3.5%, have the thickest brazing joints, followed by alloys 2 and 4, for a content of 3 and 2.5%, and finally 1 and 6, for a content of 2.5%.

For all these cases, the aptitude for brazing appears better than that of reference alloy AA7072. Alloy 7, with an Si content of 2.0%, does not provide sufficiently significant improvement as compared to the reference case.

Obviously, in the case of the cladding with alloy 4045 on both sides, the aptitude for brazing is excellent.

Internal corrosion resistance, on the side with the cladding layer forming a sacrificial anode, was also evaluated by means of a corrosive solution test, or "OY" test The test carried out involves maintaining for 3 days at 88° C. a sample of brazing sheet, typically of dimensions 60×100 mm, protecting the side not to be examined, in a liquid solution containing many ionic species (sulfate, chloride, ferric, cupric).

The ionic concentrations of this solution are given in table 4 below:

TABLE 4

| Ion | Concentration in ppm | Salts used | Mass introduced in mg |
|---|---|---|---|
| $Cl^-$ | 195 | NaCl | 2272.7 |
| $SO_4^{2-}$ | 60 | $Na_2SO_4 \cdot 10H_2O$ | 1961.7 |

TABLE 4-continued

| Ion | Concentration in ppm | Salts used | Mass introduced in mg |
|---|---|---|---|
| $Fe^{3+}$ | 30 | $FeCl_3.6H_2O$ | 1452 |
| $Cu^{2+}$ | 1 | $CuSO_4.5H_2O$ | 39.9 |

Corrosion resistance is quantified by measurements of pitting depth using a differential focusing technique from the field of optical microscopy and qualified by metallographic observations in cross-sections.

The results presented in table 5 below correspond to the average of the 7 deepest pits.

TABLE 5

| Alloy | 4045 | 7072 | 1 | 2 | 3 | 4 | 5 | 6 | 7 |
|---|---|---|---|---|---|---|---|---|---|
| Average depth (μm) | 122 | 86 | 85 | 87 | 92 | 81 | 85 | 77 | 86 |

The depths of pits observed, for the six alloys according to the invention together with alloy 7, are of the same order as those measured in the case of reference alloy AA7072.

The metallographic cross-sections performed on these samples after the "OY" test show that the mode of corrosion of sheets according to the invention is the same as that of cladded sheets of reference alloy AA7072, i.e. lateralized, and that the maximum pitting depth is comparable.

In the case of alloy 4045 cladding on both sides, the average pitting depth is 122 μm, i.e. 50% greater than for reference 7072 and the alloys according to the invention.

Corrosion behavior of sheets according to the invention is therefore at least equivalent to that of a brazing sheet of prior art whose internal layer consists of an alloy of series AA7072, the internal cladding alloy most frequently used.

On the other hand, in accordance with the desired objective, these sheets are perfectly suited to brazing also on the layer of cladding forming the sacrificial anode according to the invention.

The invention claimed is:

1. Brazing sheet made up of a core sheet made of aluminum alloy clad on at least one side with a layer of cladding forming a sacrificial anode, characterized in that said layer of cladding consists of an aluminum alloy of chemical composition, expressed as percentages by weight:
   Si: greater than 2.0 and up to 7.0;
   Fe: less than 0.3;
   Cu: less than 1.0;
   Mn: 1.0 to 2.0;
   Mg: less than 0.5;
   Zn: 1.0 to 3.0;
   Cr: less than 0.25;
   Ni: less than 1.5;
   Ti: less than 0.25;
   Co: less than 1.5;
   V, In, Sn, Zr, and Sc: less than 0.25 each;
   other elements: less than 0.05 each and 0.15 in total;
   wherein the remainder is aluminum.

2. Brazing sheet according to claim 1, characterized in that the Cu content of the layer of cladding is lower than 0.8%.

3. Brazing sheet according to claim 1, characterized in that the Cu content of the layer of cladding is lower than 0.05%.

4. Brazing sheet according to claim 1, characterized in that the Mg content of the layer of cladding is lower than 0.3%.

5. Brazing sheet according to claim 1, characterized in that the Mg content of the layer of cladding is lower than 0.05%.

6. Brazing sheet according to claim 1, characterized in that the Mg content of the layer of cladding is lower than 0.01%.

7. Brazing sheet according to claim 1, characterized in that the Zn content of the layer of cladding lies between 1.5 and 2.5%.

8. Brazing sheet according to claim 1, characterized in that the layer of cladding is applied only to one side of the core sheet made of an aluminum alloy of the AA3xxx series.

9. Brazing sheet according to claim 8, characterized in that the other side of the core sheet is clad with a layer of aluminum brazing alloy of the AA4xxx series.

10. Brazing sheet according to claim 9, characterized in that the various layers of cladding, brazing and core sheet are assembled by co-rolling.

11. Heat exchanger tube made by folding and brazing from a brazing sheet according to claim 1, characterized in that the layer of cladding forming a sacrificial anode constitutes the lining of the tube or "inner-liner."

12. Brazing sheet made up of a core sheet made of aluminum alloy clad on at least one side with a layer of cladding forming a sacrificial anode, characterized in that said layer of cladding consists of an aluminum alloy of chemical composition, expressed as percentages by weight:
   Si: 3.0 to 5.0;
   Fe: less than 0.5;
   Cu: less than 1.0;
   Mn: 1.0 to 2.0;
   Mg: less than 0.5;
   Zn: 1.0 to 3.0;
   Cr: less than 0.25;
   Ni: less than 1.5;
   Ti: less than 0.25;
   Co: less than 1.5;
   V, In, Sn, Zr, and Sc: less than 0.25 each;
   other elements: less than 0.05 each and 0.15 in total;
   wherein the remainder is aluminum.

13. Brazing sheet according to claim 12, characterized in that the Si content of the layer of cladding lies between 3.0 and 4.0%.

14. Brazing sheet according to claim 12, characterized in that the Cu content of the layer of cladding is lower than 0.8%.

15. Brazing sheet according to claim 12, characterized in that the Cu content of the layer of cladding is lower than 0.05%.

16. Brazing sheet according to claim 12, characterized in that the Mg content of the layer of cladding is lower than 0.3%.

17. Brazing sheet according to claim 12, characterized in that the Mg content of the layer of cladding is lower than 0.05%.

18. Brazing sheet according to claim 12, characterized in that the Mg content of the layer of cladding is lower than 0.01%.

19. Brazing sheet according to claim 12, characterized in that the Zn content of the layer of cladding lies between 1.5 and 2.5%.

20. Brazing sheet according to claim 12, characterized in that the layer of cladding is applied only to one side of the core sheet made of an aluminum alloy of the AA3xxx series.

21. Brazing sheet according to claim 20, characterized in that the other side of the core sheet is clad with a layer of aluminum brazing alloy of the AA4xxx series.

22. Brazing sheet according to claim 21, characterized in that the various layers of cladding, brazing and core sheet are assembled by co-rolling.

23. Brazing sheet according to claim 12, characterized in that the layer of cladding is applied only to one side of a core sheet made of alloy 3915.

24. Brazing sheet according to claim 12, characterized in that the layer of cladding is applied only to one side of a core sheet made of alloy 3916.

25. Heat exchanger tube made by folding and brazing from a brazing sheet according to claim 12, characterized in that the layer of cladding forming a sacrificial anode constitutes the lining of the tube or "inner-liner."

26. Brazing sheet made up of a core sheet made of aluminum alloy clad on at least one side with a layer of cladding forming a sacrificial anode, characterized in that said core sheet consists of alloy 3915, and said layer of cladding consists of an aluminum alloy of chemical composition, expressed as percentages by weight:

Si: greater than 2.0 and up to 7.0;
Fe: less than 0.5;
Cu: less than 1.0;
Mn: 1.0 to 2.0;
Mg: less than 0.5;
Zn: 1.0 to 3.0;
Cr: less than 0.25;
Ni: less than 1.5;
Ti: less than 0.25;
Co: less than 1.5;
V, In, Sn, Zr, and Sc: less than 0.25 each;
other elements: less than 0.05 each and 0.15 in total;
wherein the remainder is aluminum.

27. Brazing sheet made up of a core sheet made of aluminum alloy clad on at least one side with a layer of cladding forming a sacrificial anode, characterized in that said core sheet consists of alloy 3916, and said layer of cladding consists of an aluminum alloy of chemical composition, expressed as percentages by weight:

Si: greater than 2.0 and up to 7.0;
Fe: less than 0.5;
Cu: less than 1.0;
Mn: 1.0 to 2.0;
Mg: less than 0.5;
Zn: 1.0 to 3.0;
Cr: less than 0.25;
Ni: less than 1.5;
Ti: less than 0.25;
Co: less than 1.5;
V, In, Sn, Zr, and Sc: less than 0.25 each;
other elements: less than 0.05 each and 0.15 in total;
wherein the remainder is aluminum.

* * * * *